US008738363B2

(12) United States Patent
Brun et al.

(10) Patent No.: US 8,738,363 B2
(45) Date of Patent: May 27, 2014

(54) SYSTEM AND METHOD FOR SUGGESTION MINING

(75) Inventors: Caroline Brun, Grenoble (FR); Caroline Hagege, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 428 days.

(21) Appl. No.: 13/272,553

(22) Filed: Oct. 13, 2011

(65) Prior Publication Data

US 2013/0096909 A1   Apr. 18, 2013

(51) Int. Cl.
G06F 17/28 (2006.01)
G06F 17/27 (2006.01)
G06F 17/21 (2006.01)

(52) U.S. Cl.
USPC ............ 704/9; 704/4; 704/10

(58) Field of Classification Search
USPC .................. 704/4, 9, 10
See application file for complete search history.

(56) References Cited

U.S. PATENT DOCUMENTS

| | | | |
|---|---|---|---|
| 7,058,567 B2 | 6/2006 | Ait-Mokhtar et al. | |
| 7,130,777 B2 * | 10/2006 | Garg et al. | 703/2 |
| 7,523,085 B2 * | 4/2009 | Nigam et al. | 706/55 |
| 7,930,302 B2 * | 4/2011 | Bandaru et al. | 707/737 |
| 8,280,885 B2 * | 10/2012 | Cardie et al. | 707/737 |
| 2004/0158454 A1 | 8/2004 | Polanyi et al. | |
| 2005/0108001 A1 * | 5/2005 | Aarskog | 704/10 |
| 2005/0278362 A1 * | 12/2005 | Maren et al. | 707/100 |
| 2007/0073678 A1 * | 3/2007 | Scott et al. | 707/5 |
| 2007/0282867 A1 * | 12/2007 | McAllister et al. | 707/100 |
| 2008/0249764 A1 * | 10/2008 | Huang et al. | 704/9 |
| 2009/0112892 A1 * | 4/2009 | Cardie et al. | 707/100 |
| 2009/0125805 A1 * | 5/2009 | Ananthanarayanan et al. | 715/255 |
| 2009/0193328 A1 * | 7/2009 | Reis et al. | 715/231 |
| 2009/0265304 A1 | 10/2009 | Ait-Mokhtar et al. | |
| 2009/0319518 A1 * | 12/2009 | Koudas et al. | 707/5 |
| 2010/0023311 A1 * | 1/2010 | Subrahmanian et al. | 704/2 |
| 2010/0228693 A1 * | 9/2010 | Dawson et al. | 706/12 |
| 2012/0102050 A1 * | 4/2012 | Button et al. | 707/749 |

OTHER PUBLICATIONS

Ait-Mokhtar, et al., "Robustness beyond Shallowness: Incremental Dependency Parsing", Natural Language Engineering, 2002, vol. 8, (2/3), pp. 121-144.

Goldberg, et al, "May all your wishes come true: A study of wishes and How to recognize them", HLT-NAACL, The Association for Computation Linguistics, 2009, pp. 263-271.

(Continued)

Primary Examiner — Edgar Guerra-Erazo
(74) Attorney, Agent, or Firm — Fay Sharpe LLP (57) ABSTRACT

A system and method for extraction of suggestions for improvement form a corpus of documents, such as customer reviews, are disclosed. A structured terminology provided or a topic includes a set of semantic classes, each including a set of terms. A thesaurus of terms relating to suggestions of improvement is provided. Text elements of text strings in the documents which are instances of terms in the structured terminology are labeled with the corresponding semantic class and text elements which are instances of terms in the thesaurus are also labeled. A set of patterns is applied to the labeled text strings to identify suggestions of improvement expressions. The patterns define syntactic relations between text elements, some of which are required to be instances of one of the terms in a particular semantic class or thesaurus. A set of suggestions for improvements is output based on the identified suggestions of improvement expressions.

23 Claims, 5 Drawing Sheets

(56) References Cited

OTHER PUBLICATIONS

Vishwanath, J et al. "User suggestions Extraction from customer Reviews—A Sentiment Analysis Approach", IJCSE, Mar. 2011, vol. 3, No. 3, pp. 1203-1206.

Ait-Mokhtar, et al. "Incremental Finite-State Parsing", Proc. 5th Conf. on Applied Natural Language Processing (ANLP'97), 1997, pp. 72-79.

Ait-Mokhtar, et al. "Subject and object dependency extraction using finite-state transducers", Proc. 35th Conf. of the Association for Computational linguistics (ACL'97), Workshop on information extraction and the building of lexical semantic resources for NLP applications, 1997, pp. 71-77.

Brun, et al. "Normalization and paraphrasing using symbolic methods", ACL: second international workshop on Paraphrasing, Paraphrase acquisition and applications, 2003, pp. 7-12, Sapporo, Japan.

Grefenstette, G. "Comparing two language indentification schemes", Proc. 3rd International Conf. on the Statistical analysis of textual data (JADT'95), 1995, pp. 1-6, Rome, Italy.

U.S. Appl. No. 13/037,450, filed Mar. 3, 2011 titled "Linguistically enhanced email detector".

U.S. Appl. No. 13/052,686, filed Mar. 21, 2011 titled "Corpus-based system and method for acquiring polar adjectives".

U.S. Appl. No. 13/052,774, filed Mar. 21, 2011 titled "Customer review authoring assistant".

* cited by examiner

SYSTEM AND METHOD FOR SUGGESTION MINING

BACKGROUND

The exemplary embodiment relates to the field of information mining. It finds particular application in the automated mining of customer reviews for suggestions that the customer has made about the product or service which is the subject of the review.

Opinion mining is widely used in natural language processing, computational linguistics, and text mining by those seeking to obtain the opinions of customers and other reviewers on their products and services. Opinion mining generally aims at detecting whether the comments of reviewers are positive or negative. Opinions are often expressed on online review sites, social networks, personal blogs, e-forums, and in dedicated customer feedback pages of company websites.

In a customer review, for example, the reviewer may be asked to rate a particular product, on a scale of, for example, to 10, and to provide their comments on the product in a free text format, which allows the user to comment on the product in their own words. Sometimes, reviewers suggest improvements about the product that they are reviewing, which is quite different from expressing an opinion. Suggestions of improvements on a product are often made discursively, either by wishing the presence of a missing feature or component, or by regretting the absence of such a feature or component. This type of comment goes beyond the scope of traditional sentiment analysis, and thus the information provided by the suggestions is not collected. Suggestions could provide valuable information which could be analyzed in the context of business analytics, if techniques were available to extract them from the bulk of comments that are submitted.

To illustrate this problem, the following sentences give some instances of suggestions of improvements manually extracted from a corpus of user's comments about printers (the names of companies and products have been anonymized):

"ABC Co. should have made the bin deep enough to hold an entire ream (500 sheets)."

"Why ABC Co. didn't opt to throw in a 500-sheet tray with at least the standard 7 sizes (as per the 250-sheet tray) is beyond me."

"This XYZ has filled the bill in those areas, however, for the price, BCD Co. should have considered throwing in more features and lowering the print costs."

"I think they should have put a faster scanner on the machine, one at least as fast as the printer."

"My only regret was that this unit could not fax!"

"If you're considering any CDE Co. inkjet, I think most people will be happy with the ZXY, which is only missing the automatic paper feed."

A manufacturer of printers, for example, would be interested in reviewing such suggestions. However, the process of extracting them manually from a corpus of reviews is very time consuming.

A system and method for mining text are provided which enable suggestions such as these to be automatically extracted from unstructured text by natural language processing.

INCORPORATION BY REFERENCE

The following references, the disclosures of which are incorporated herein by reference in their entireties, are mentioned:

Techniques useful in opinion mining are discussed, for example, in U.S. application Ser. No. 13/052,686, filed on Mar. 21, 2011, entitled CORPUS-BASED SYSTEM AND METHOD FOR ACQUIRING POLAR ADJECTIVES, by Caroline Brun; U.S. application Ser. No. 13/052,774, filed on Mar. 21, 2011, entitled CUSTOMER REVIEW AUTHORING ASSISTANT, by Caroline Brun. U.S. Pub. No. 2009/0265304, published Oct. 22, 2009, entitled METHOD AND SYSTEM FOR RETRIEVING STATEMENTS OF INFORMATION SOURCES AND ASSOCIATING A FACTUALITY ASSESSMENT TO THE STATEMENTS by Aït-Mokhtar, et al., and U.S. Pub. No. 2004/0158454, entitled SYSTEM AND METHOD FOR DYNAMICALLY DETERMINING THE ATTITUDE OF AN AUTHOR OF A NATURAL LANGUAGE DOCUMENT, by Livia Polanyi, et al.

A parser for syntactically analyzing an input text string is disclosed, for example, in U.S. Pat. No. 7,058,567, issued Jun. 6, 2006, entitled NATURAL LANGUAGE PARSER, by Aït-Mokhtar, et al., and in Aït-Mokhtar, et al., "Robustness beyond Shallowness: Incremental Dependency Parsing," Special Issue of NLE Journal (2002); Aït-Mokhtar, et al., "*Incremental Finite-State Parsing*," in Proc. 5th Conf. on Applied Natural Language Processing (ANLP'97), pp. 72-79 (1997), and Aït-Mokhtar, et al., "*Subject and Object Dependency Extraction Using Finite-State Transducers*," in Proc. 35th Conf. of the Association for Computational Linguistics (ACL '97) *Workshop on Information Extraction and the Building of Lexical Semantic Resources for NLP Applications*, pp. 71-77 (1997).

BRIEF DESCRIPTION

In accordance with one aspect of the exemplary embodiment, a method for extraction of suggestions for improvement includes providing a structured terminology for a topic. The structured terminology includes a set of semantic classes. Each of a plurality of the semantic classes includes a finite set of terms. A thesaurus of terms relating to suggestions of improvement is also provided. A corpus of text documents is received, each document comprising a text string in a natural language. Text elements in the text strings which are instances of terms in the structured terminology are labeled with the corresponding semantic class. Text elements in the text strings which are instances of terms in the thesaurus are labeled. A set of patterns is applied to the labeled text strings to identify suggestions of improvement expressions. Each of the patterns defines a syntactic relation between text elements. The patterns include at least one pattern for each of the semantic classes in the set. These patterns specify a syntactic relation in which one of the text elements in the relation is labeled as an instance of the semantic class. At least one of the patterns in the set specifies a syntactic relation in which one of the text elements in the relation is labeled as an instance of one of the terms in the thesaurus. A set of suggestions for improvements is output. The suggestions are based on the identified suggestions of improvement expressions. One or more of the steps of the method can be performed with a computer processor.

In another aspect, a system for extraction of suggestions for improvement includes a structured terminology for a topic, a thesaurus of terms relating to suggestions of improvement, and a set of suggestion patterns for identifying suggestions of improvement expressions in input text, which are all stored in memory. The structured terminology includes a set of semantic classes. Each of a plurality of the semantic classes includes a finite set of terms. The patterns each define a syntactic relation between two text elements. The patterns include, for each of the semantic classes in the set of semantic classes, at least one pattern which specifies a syntactic relation in which one of the text elements in the relation is labeled as an instance of the semantic class. At least one of the patterns specifies a syntactic relation in which one of the text elements in the relation is labeled as an instance of a term in the thesaurus. A parser is configured for labeling text elements in text strings with the corresponding semantic class that are instances of terms in the structured terminology and for labeling text elements which are instances of terms in the thesaurus. A suggestion review component is configured for extracting suggestions for improvement expressions by applying the set of patterns to the input text strings and for outputting suggestions for improvement based on the extracted expressions. The parser and the suggestion review component can be implemented by a processor.

In another aspect, a method for forming a system for extraction of suggestions for improvement includes generating a structured terminology for a topic, the structured terminology including a set of semantic classes, each of a plurality of the semantic classes including a finite set of terms related to the respective semantic class, the terms in the structured terminology including nouns or noun phrases and not verbs. A thesaurus of terms relating to suggestions of improvement is generated. The terms in the thesaurus include verbs. A set of patterns to be applied to text strings to identify suggestions of improvement expressions is generated. The patterns each define a syntactic relation between two text elements. The patterns include, for each of the semantic classes in the set, at least one pattern which specifies a syntactic relation in which one of the text elements in the syntactic relation is labeled as an instance of the semantic class. At least one of the patterns specifies a syntactic relation in which one of the text elements in the relation is labeled as an instance of a term in the thesaurus. The patterns are tested on a corpus of text documents to evaluate the performance of the system. One or more of the steps of the method can be performed with a computer processor.

DETAILED DESCRIPTION

Aspects disclosed herein relate to a method for suggestion extraction, a suggestion extraction system, and a method for forming such a system.

A "text element," as used herein, can comprise a word or group of words which together form a part of a generally longer text string, such as a sentence, in a natural language, such as English or French. In the case of ideographic languages, such as Japanese or Chinese, text elements may comprise one or more ideographic characters.

The exemplary system and method use Natural Language Processing (NLP) techniques for automatically extracting suggestions of improvements in reviewers' comments on a particular topic. An extracted suggestion for improvement (or simply a "suggestion"), as used herein, includes a sequence of text elements which include one or more extracted expressions which meet one or more predefined patterns which qualify/qualifies the sequence as a suggestion for improvement.

The exemplary suggestion extraction system may include the following components:

1. A structured terminology of the target topic for which suggestions of improvements are to be extracted.
2. A thesaurus of vocabulary related to suggestion expressions (e.g., wishes, regrets, lacks).
3. A linguistic parser able to produce deep syntactic and morphological analysis of the texts to be processed, from which such expressions can be extracted.

Figure 1:
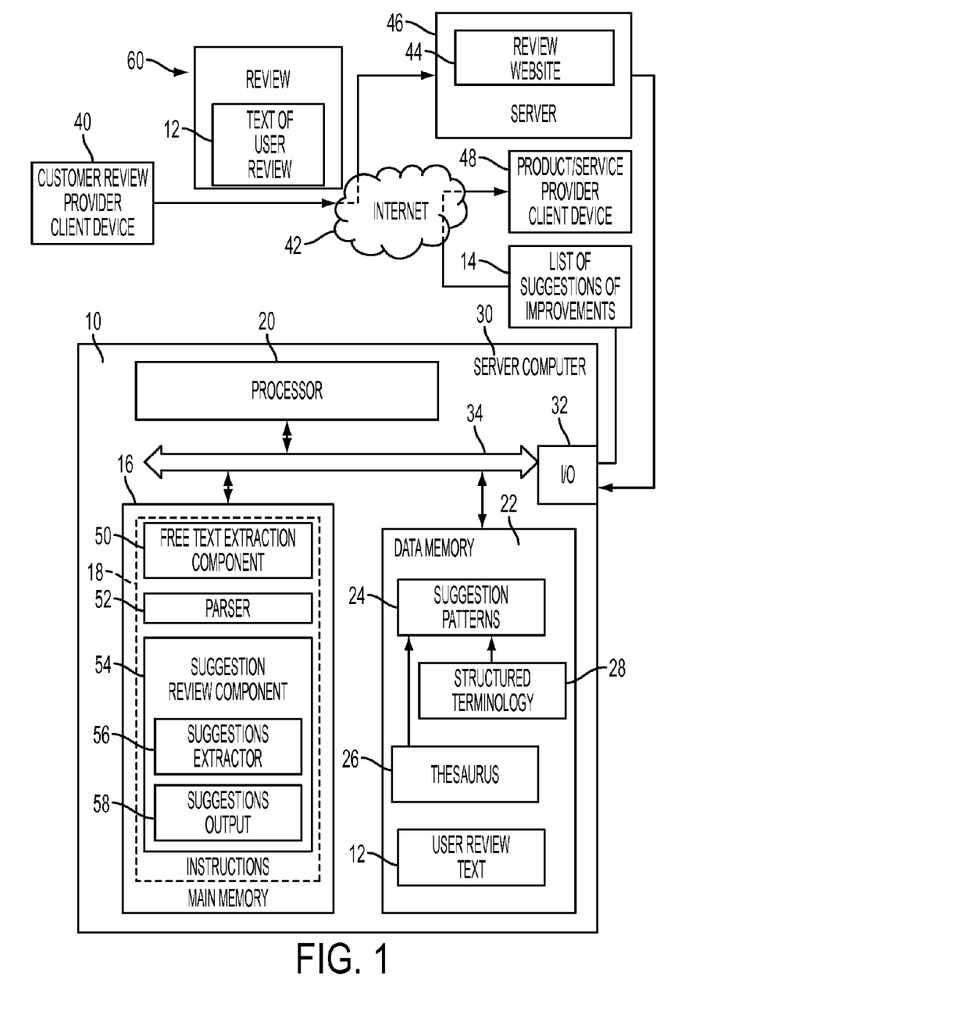
FIG. 1 is a functional block diagram of a system for extracting suggestions from text.
Figure 2:
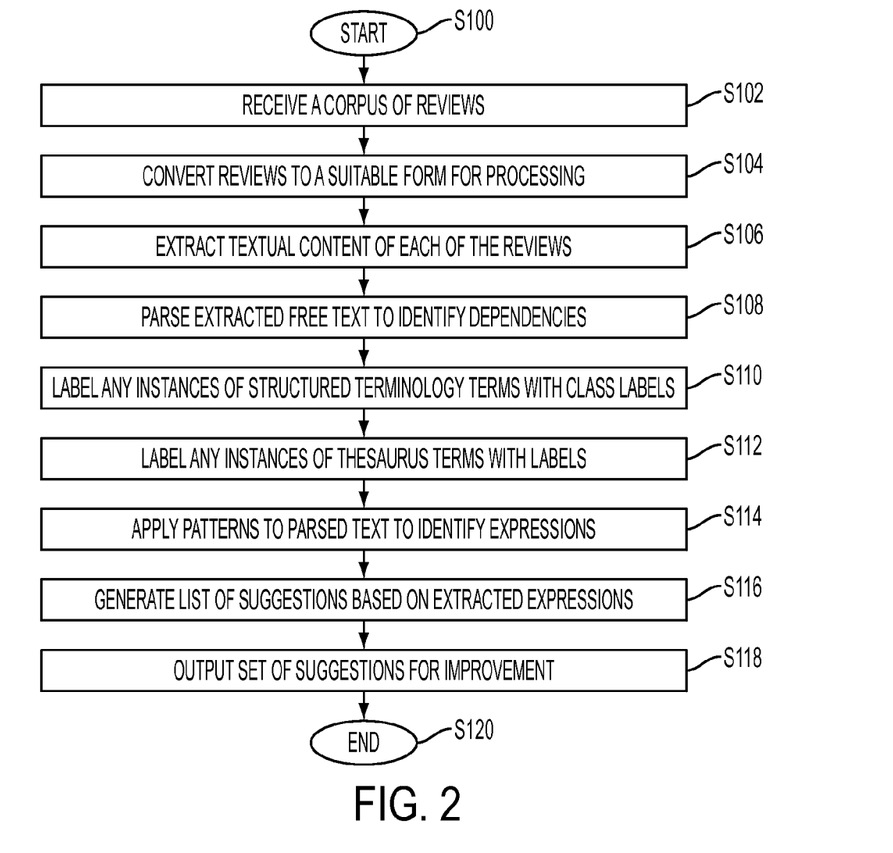
FIG. 2 illustrates a method for extracting suggestions from text.

By way of example, FIG. 1 illustrates an exemplary suggestion extraction system 10, which can be used to perform the method illustrated in FIG. 2. The system 10 is adapted to receiving a corpus of text documents, each comprising free text 12, such as a customer review of a topic, and for outputting suggestions of improvements 14, based on information extracted from one or more such free texts, e.g., in the form of a list. The topic can be, for example, a product or service, and the free text can be written in a natural language, such as English, which the system 10 is adapted to process. The list 14 may include a set of one or more natural language text strings extracted from the free texts, such as sentences, each sentence comprising one or more identified suggestions for improvement.

The system 10 includes main memory 16 in which are stored instructions 18 for performing the exemplary method(s) described herein. A processor 20, in communication with the memory 16, is configured for executing the instructions 18. Data memory 22, which may be separate from or integral with the main memory 16, stores a set of suggestion patterns 24 for identifying instances of suggestions for improvement in the input text, a thesaurus 26, and a structured terminology 28 comprising one or more data structures, which will be described in greater detail below.

The exemplary suggestion extraction system 10 is resident on one or more computing devices 30 and includes one or more input/output devices 32 for communicating with external devices. Hardware components 16, 20, 22, 32 of the system 10 may be communicatively linked via a data/control bus 34.

The user review 12 can be input to the system 10 in any suitable form, e.g., from a customer-operated client device 40, which is connected with the system 10 via a wired or wireless link 42, such as a wired connection, local area network, or wide area network, such as the Internet. In other embodiments, the review 12 is input to the system 10 from a memory storage device, such as a disk or memory stick. In another embodiment, the customer reviews 12 are retrieved from memory associated with a customer review website 44, which is hosted by a local or remote server computer 46. The list 14 of suggestions may be output, e.g., via a wired or wireless link, to a client device such as device 40 or a separate device 48. Client device 48 may be operated, for example, by a provider of the product or service which is the subject of the customer reviews 12. The provider may be a manufacturer, retailer, advertising agency, or other person or organization.

The computer 30 hosting the exemplary system 10 may include one or more specific or general purpose computers, such as a PC, such as a desktop, a laptop, palmtop computer, portable digital assistant (PDA), server computer, cellular telephone, tablet computer, pager, combination thereof, or other computing device capable of executing instructions for performing the exemplary method. In some cases, software components may be wholly or partly resident on the client computing device. Client devices 40, 48 may be configured similarly to the computer system 30, i.e., with memory, a processor, and one or more network interfaces for communicating with external devices.

The memory 16, 22 may represent any type of non-transitory computer readable medium such as random access memory (RAM), read only memory (ROM), magnetic disk or tape, optical disk, flash memory, or holographic memory. In one embodiment, the memory 16, 22 comprises a combination of random access memory and read only memory. Memory 16, 22 stores instructions for performing the exemplary method as well as the processed data. In some embodiments, the processor 20 and memory 16 and/or 22 may be combined in a single chip. The exemplary network interface(s) 32 allow(s) the computer to communicate with other devices via a computer network and may comprise a modulator/demodulator (MODEM).

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 30, executes instructions stored in memory 16 for performing the method outlined in FIG. 2.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

The system 10 includes, e.g., stored in memory 16, or accesses from remote memory, a free text extraction component 50, for extracting free text from a customer review, a linguistic parser 52, for parsing the extracted free text, and a suggestion review component 54, which may be integral with or separate from the parser 52. The suggestion review component 54 includes a suggestions extractor 56, which extracts suggestion expressions from the syntactically parsed text that are compatible with suggestions for improvement, based on the set of suggestion patterns 24, and a suggestions output component 58, which generates a list 14 of suggestions for improvement, based on the extracted expressions. Components 50, 52, 54 may be in the form of software instructions which are executed by the processor 20.

Figure 3:
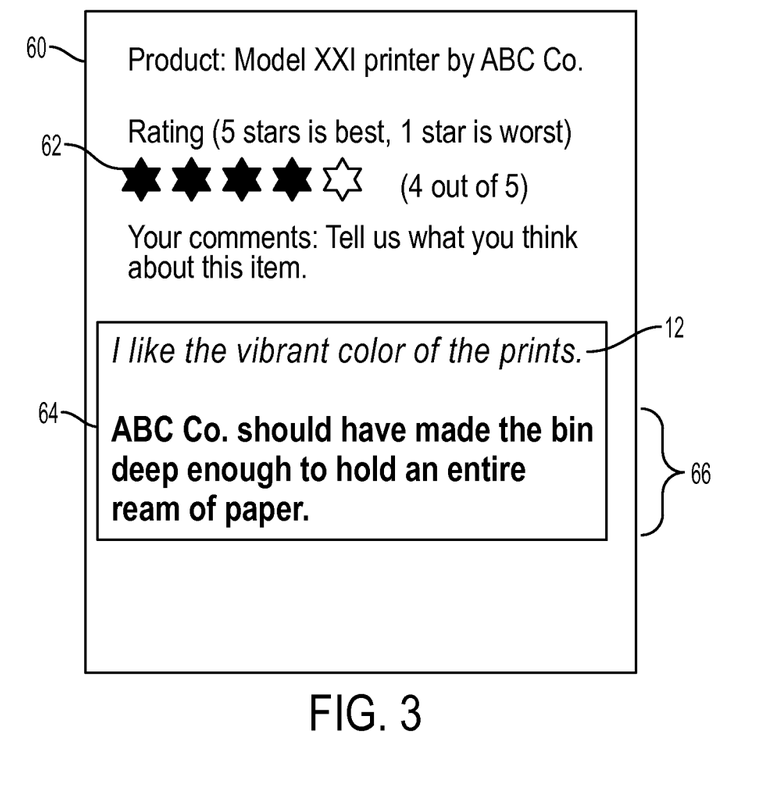
FIG. 3 illustrates an exemplary customer review of an item, from which a suggestion can be extracted.

FIG. 3 illustrates an example customer review 60 from which textual comments 12 can be extracted. For example, the review 60 includes the topic, such as the name of the product or service being reviewed, a rating 62 of the product/service provided by the reviewer, in a designated ratings field, and a designated free text field 64, in which the reviewer has typed or otherwise entered his or her free text comments 12 about the product/service. The field 64 may limit the text to a maximum number of characters. Otherwise, there is generally no restriction on what the customer can enter in the field 64. Highlighted in bold and italics is a text string 66, which the system 10 may extract from the free text 12, as being or including a suggestion expression.

FIG. 2 illustrates a suggestion extraction method which can be performed with the system 10. The method begins at S100.

At S102, a corpus of customer reviews 60 is received. While the method is amenable to processing as few as a single review, in general, a large number of reviews is processed.

At S104, the reviews 60 may be converted to a suitable form for processing, such as XML or HTML.

At S106, free text 12 is extracted from each review, e.g., from the designated field 64, if any, by free text extraction component 50.

At S108, the free text 12 is parsed by parser 52 to identify dependencies in the text which each express a syntactic relationship between words of the text, such as: subject-predicate relations; predicate-object relations, modifier-predicate relations, and the like. As will be appreciated, the exemplary method is not based on the simple co-occurrence of words in a sentence, but on the relations between pairs of text elements (words and phrases) which take into account the role of the text elements in the sentence and, in particular, with respect to each other.

At S110, the parsed text output at S108 is labeled with labels corresponding to the classes of the structured terminology 28, where instances of any of the classes are found.

At S110, the parsed text output at S108 is labeled with labels corresponding to the classes of the thesaurus 26, where instances of any of the classes are found.

As will be appreciated, S110 and S112 may be performed prior to or during the parsing step.

At S114, suggestion patterns 24 are applied to the parsed and labeled text by the suggestions extractor 56 to identify suggestion expressions in the text. These are expressions that are predicted to be found in suggestions for improvement.

At S116, a list 14 of suggestions for improvement is generated, e.g., by the suggestions output component 58, based on the extracted suggestion expressions.

At S118, the list 14 is output from the system 10.

The method ends at S120.

Figure 4:
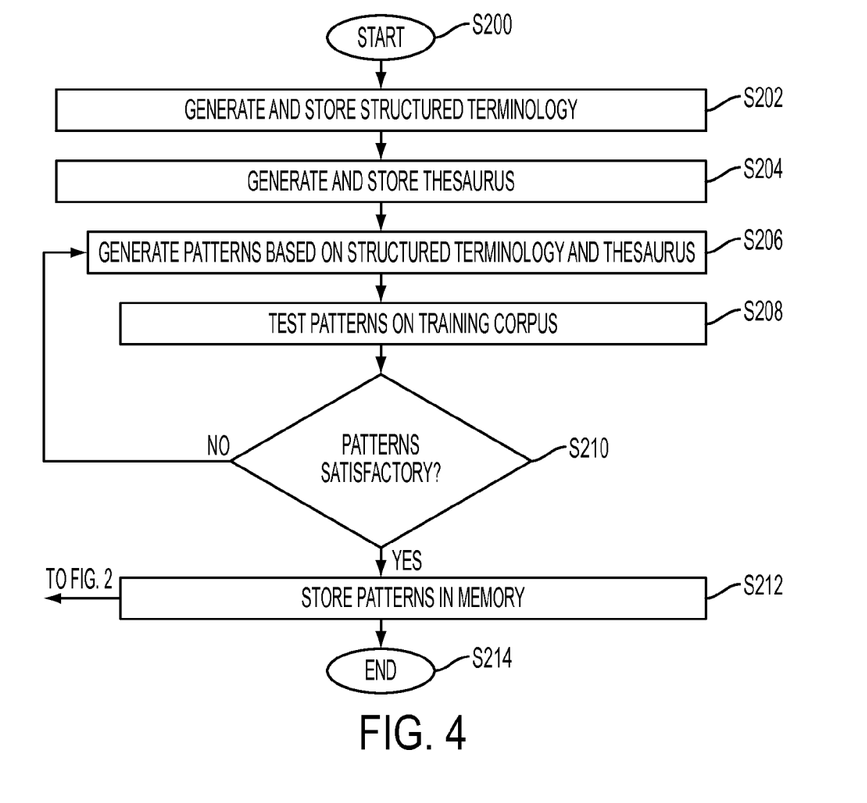
FIG. 4 illustrates a method for generating a system for extracting suggestions from text.

FIG. 4 illustrates a method of forming the exemplary system 10. The method begins at S200.

At S202, a structured terminology 28 of the topic which is the subject of the reviews is generated and is stored in memory 22. This may be performed manually or partially or entirely automatically.

At S204, a thesaurus 26 of text elements which can be used to express a wish (and any conditions on these text elements) is generated and is stored in memory. This may be performed manually or partially or entirely automatically.

At S206, suggestion patterns 24 are generated based on the structured terminology 28 and thesaurus 26 and are stored in memory. This may be performed manually or partially or entirely automatically. Each pattern 24 generally requires at least one of a) a specified one of the classes in the structured terminology, and b) a text element in the thesaurus.

At S208, the patterns 24 may be tested on a training corpus of free texts to evaluate the performance of the patterns, e.g., in terms of retrieval and/or precision. If at S210 the performance is not at a satisfactory level (e.g. a computed precision and/or recall is below a threshold percentage), the patterns may be modified at S206 and retested until an acceptable performance is obtained.

At S212, the final patterns 24 are stored in memory 22. The method may then proceed to FIG. 2 or may end at 5214.

The method illustrated in FIGS. 2 and/or 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary method(s) may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 4, can be used to implement the method for extracting suggestions.

Further details of the system and method will now be described.

Free Text

The input to the system 10 can be a set of texts 12 of user's comments about a particular topic. While in the exemplary embodiment the topic relates to a product or service, the topic of the review can be manufactured products, such as books, mechanical devices, and clothing; services, such as educational, professional, and domestic services; events, such as sporting events, movies, and shows; tourist places, such as restaurants, accommodations, and locations, or the like.

Structured Terminology

The structured terminology 28 is a description of the topic. As an example, for a manufactured product such as a printer (or other electromechanical device), the terminology expresses concepts related to the products generally classed as printers. In the exemplary embodiment, these are partitioned into a number of discrete semantic classes each with an associated finite set of terms. These may include at least there or at least four of the following:

1. The manufacturer of the product (for example, ABC Co.)
2. The trade name of the product (for example, XYZ™ printer)
3. The type of product (for example, printer, fax machine)
4. Physical parts: Component relationships which express "part-of" concepts of the product. For example, a printer may include, as parts-of concepts, a paper tray, a paper feeder, an output tray, a marking device, etc., which may include one or more subcomponents as parts-of these general components. For example, the marking device may include, as subcomponents, a photoreceptor and one or more toner bottles which store the marking material.
5. Physical characteristics (physical attributes) of the product or its components/subcomponents (for example, weight, aspect).
6. Functional characteristics (functional attributes) of the product or its components/subcomponents (for example, capacity, reliability).
7. Commercial/technical characteristics (commercial attributes) of the product or its components/subcomponents (for example speed, price, noise). (optionally combined with class 6).
8. Other aspects of the product not covered by the other classes.

As will be appreciated, two or more of these classes may be combined or split into two or more classes or additional/fewer classes may be provided, depending on the interests of the suggestions seeker.

Figure 5:
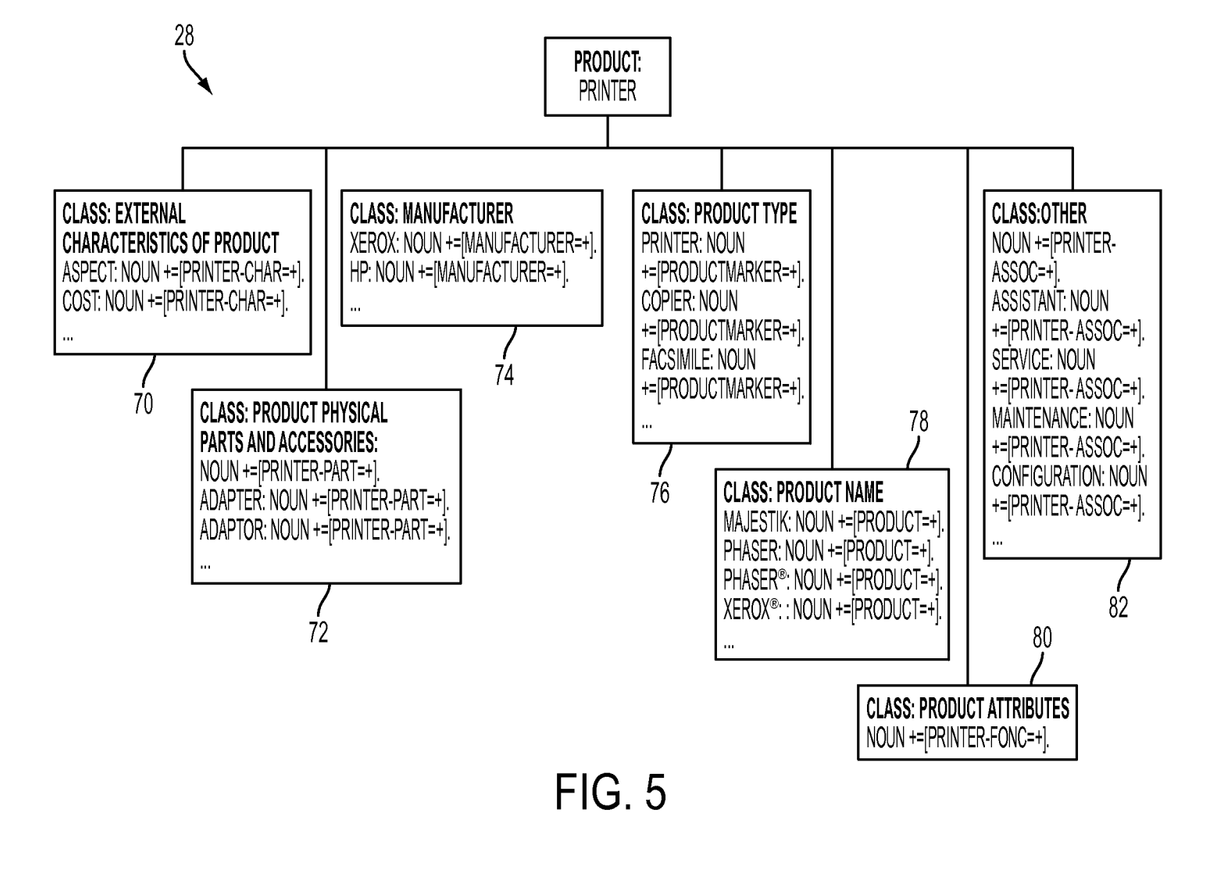
FIG. 5 illustrates a structured terminology applicable to a type of commercial product, such as printers.

The structured terminology 26 can be arranged as a set of classes 70, 72, 74, 76, 78, 80, each comprising a set of terms, as illustrated in FIG. 5. For example, there may be at least 2 or at least 3 or at least 4 classes, such as up to about 10 classes. In general, each class includes a plurality of terms; the number of terms can vary depending on the particular class. For example at least two or at least three of the classes each includes at least five terms or at least ten terms and at least two or at least three of the classes each includes fewer than 100 terms, e.g., fewer than 20 terms. The total number of terms in the structured terminology may be, for example, less than 1000 terms or less than 200 terms. Each of the classes includes a different set of terms, although in some cases, some, but not all of the terms may be overlapping, for example, if the name of the manufacturer is the same as the name of the product. However, in general each class includes at least one or at least three terms which are not in any of the other classes. In one embodiment, at least 90% or 95% and up to 100% of the terms in the structured terminology are each present in only one of the classes. In general, a majority of the terms in the classes are text elements which are nouns or noun phrases. For example, at least 50% or 80% or 90% and up to 100% of the terms in the structured terminology are nouns or noun phrases. In one embodiment, all the terms in a majority of the classes (at least 50% or 80% or 90% and up to 100% of the classes) in the structured terminology are nouns or noun phrases. The exemplary structured terminology does not include any verbs. In general the terms are short, containing at a maximum, a few words. For example each term may be, in general, from 1 to 5 words in length, with fewer than 1 in 20 of the terms in the structured terminology being longer than 5 words in length.

TABLE 1 shows an example structured terminology 28 for a topic relating to printers. The classes are associated with labels which are assigned to the nouns when found in a text 12. In general, the class label is only triggered if the word serves as a noun in a sentence. Thus, the text string "I often look at my XYZ printer," will not trigger the "printer characteristics" class label because the word look is not used as a noun.

The structured terminology can be part of an already existing one if available (e.g., in an existing opinion mining system) or can be acquired from processing texts of the domain of interest as fairly simple ontological relations are needed. As will be appreciated, the terms in the terminology can be expanded manually or automatically through use of a thesaurus.

TABLE 1

Example Structured Terminology: Product-related Nouns by Class

| Semantic Class | Label | Example terms (each term is separated by a semicolon) |
|---|---|---|
| 1. Manufacturer | noun += [manufacturer=+]. | Xerox; HP; Brother; Hewlett-Packard; Canon; ABC Co. (for generic examples below) |
| 2. Product name | noun +=[product=+]. digits+=[product=+, mwe=+]. | MajestiK; Phaser; Phaser ®; Xerox ®; DocuTech; DocuPrint; Nuvera ™; 7840W |
| 3. Product type | noun +=[productmarker=+]. e.g.,;printer noun +=[productmarker=+] | printer; copier; facsimile; multifunction device; scanner |
| 4. Printer physical parts (printer part-of), | noun +=[printer-part=+]. | accessory; adapter; adaptor; belt; bin; board; button; cardboard; cartridge; chassis; compartment; consumables; control panel; fax; side; toner; . . . and many more |
| | noun +=[printer-assoc=+]. | software |
| 5. Printer functional physical aspects (technical point of view) | noun +=[printer-fonc=+]. | function; capability; capacity; reliability; ability; property; resolution; performance; responsiveness; durability; flexibility; connectivity; life-time; lifetime; specification; compatibility; feature; possibility . . . |
| 6. Printer external characteristics (commercial/functional) | noun +=[printer-char=+]. | aspect; cost; design; length; look; noise; price; size; volume; weight; speed |
| 7. Other associated terms | noun +=[printer-assoc=+]. | manufacturer; assistant; service; maintenance; configuration; documentation; warranty; maker; profile; spectrum; producer; generation; duplexing; lightweight; workhorse; feature |

The exemplary parser 52 can extract instances of these terms, where they appear in the text. By "instance" it is meant that the term is present in the text as a text element (e.g., in the singular or plural form in the case of a noun) and meets any specified requirements, such as that it be used in the text as a noun in the case of the example terms above. The parser should also be able to extract named entities related to the domain, for example with a named entity recognition component.

Thesaurus of Vocabulary

The thesaurus 26 of vocabulary may include a limited set of text elements relating to wishes, regrets, and things lacking, which are found in suggestion expressions generally, i.e., are not specific to the product or other topic. In general, therefore, there is no overlap between the text elements that are in the thesaurus 26 and those in the structured terminology 28. The text elements in the thesaurus may be stored in their lemma (root) form. Patterns, however, may specify constraints on the surface form of the element in the text, such as requiring a specific tense or aspect of a verb or singular or plural in the case of a noun.

The thesaurus 26 can be extracted from existing ones.

The thesaurus 26 may also be partitioned based on semantic class. TABLE 2 shows an example set of vocabulary words for forming the thesaurus 26. These include two classes: in one are stored verbs related to a "belief" concept and in another, words related to a "lack" (absence) concept which can be verbs or nouns, e.g., identified in two subclasses.

The exemplary parser 52 is able to extract instances of these terms.

TABLE 2

Example Thesaurus of Vocabulary Related to Expressions of Wishes, Regrets, Lacks

| Class | Label | Example terms |
|---|---|---|
| belief verbs | verb += [belief=+]. | figure; think; believe; suppose; assume; consider; guess; suspect; speculate; imagine; presume; deny; disclaim; question |
| Lack: absence verbs and nouns | verb += [absence=+] noun += [absence=+] | miss; lack absence; shortage, deficiency; want; dearth; need; insufficiency; lack |
| wish | verb += [wish=+] noun += [wish=+] | wish; expect; hope_for; expectation; hope |
| regret | verb += [regret=+] noun += [regret=+] | regret |

Linguistic Parser

The parser 52 takes a text string, such as a sentence, paragraph, or even a sequence of a few words as input and breaks each sentence into a sequence of tokens (linguistic elements) and associates information with these. The parser 52 provides this functionality by applying a set of rules, called a grammar, dedicated to a particular natural language such as French, English, or Japanese. The grammar is written in a formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed for example in Salah Aï-Mokhtar, Jean-Pierre Chanod, and Claude Roux, "Robustness beyond shallowness: incremental dependency parsing," in special issue of the NLE Journal (2002); above-mentioned U.S. Pat. No. 7,058,567; and Caroline Brun and Caroline Hagège, "Normalization and paraphrasing using symbolic methods" ACL: Second International workshop on Paraphrasing, Paraphrase Acquisition and Applications, Sapporo, Japan, Jul. 7-12, 2003.

In one embodiment, the syntactic parser 52 may be based on the Xerox Incremental Parser (XIP), which may have been enriched with additional processing rules to facilitate the extraction of the exemplary patterns 24. Other natural language processing or parsing algorithms can alternatively be used.

The exemplary incremental parser 52 performs a pre-processing stage which handles tokenization, morphological analysis and part of speech (POS) tagging. Specifically, a preprocessing module of the parser breaks the input text into a sequence of tokens, each generally corresponding to a text element, such as a word, or to punctuation. Parts of speech are identified for the text elements, such as noun, verb, etc. Some tokens may be assigned more than one part of speech, and may later be disambiguated, based on contextual information. The tokens are tagged with the identified parts of speech.

A surface syntactic analysis stage performed by the parser includes chunking the input text to identify groups of words, such as noun phrases and adjectival terms (attributes and modifiers). Then, syntactic relations (dependencies) are extracted, in particular, the relations relevant to the exemplary suggestion extraction method.

Where reviews are expected to be in multiple languages, such as on a travel website, a language guesser (see, for example, in Gregory Grefenstette, "Comparing Two Language Identification Schemes," Proc. 3rd Intern'l Conf. on the Statistical Analysis of Textual Data (JADT'95), Rome, Italy (1995) and U.S. application Ser. No. 13/037,450, filed Mar. 1, 2011, entitled LINGUISTICALLY ENHANCED EMAIL DETECTOR, by Caroline Brun, et al., the disclosure of which is incorporated herein by reference in its entirety) may be used to detect the main language of the review 60 and an appropriate parser 52 for that language is then employed.

As will be appreciated, while a full rule-based parser, such as the XIP parser, is exemplified, more simplified parsing systems for analyzing the text 12 are also contemplated which may focus on only those dependencies, etc., which are relevant to the patterns 24.

In some embodiments, the parser may include a coreference module which identifies the noun which corresponds to a pronoun in a relation, by examining the surrounding text. For example, given a review which states:

I just bought the XXI printer. I wish it had a larger paper tray.

the pronoun "It" can be tagged by the coreference module of the parser to identify that it refers to the noun "printer," allowing extraction of the syntactic relation between wish and printer, for example.

In some embodiments, the parser labels words in the text 12 which are in found in the structured terminology 28 with labels corresponding to the product classes. In other embodiments, this may be handled by a separate component, such as the suggestions extractor 56. In some embodiments, the parser labels words in the text 12 which are in found in the thesaurus 26 with labels corresponding to the classes of. In other embodiments, this may be handled by a separate component, such as the suggestions extractor 56.

Suggestion Patterns

The suggestion patterns 24 generally specify a pair of text elements that are in a specific semantic relationship, where one or both includes a term that is drawn from a respective class of the structured terminology 28 or from the thesaurus 26. Although some of the patterns 24 used may not be of this form, in general at least some of the patterns are. Exemplary relations which may be extracted by the syntactic parser 52 which are of interest in the generation of include SUBJECT (a subject-predicate relation), OBJECT (an object-predicate relation), and MODIFIER (a subject-modifier relation). A subject-predicate relation, for example, extracts a link between the subject of text string, such as a sentence or clause, and its main verb. As will be appreciated, the parser can rearrange the order in the sentence to identify the true subject or object. For example, This printer has been designed by ACB Co. will be normalized to:

ACB Co. designed this printer, and a SUBJECT relation (ABC Co., designated) and/or OBJECT relation (designed, printer) can be extracted.

The modifier can be a nominal modifier or a grammatical complement of a verb which is introduced by a preposition of time, manner, or location.

The patterns 24 may also place limitations on one or more of verbal tense, modality, and verbal aspect. A modal verb, for purposes herein, can be considered as an auxiliary verb used in a form in which it is not sure whether or not the action will happen. Examples of modal verbs include "I would like the printer to have a touchscreen," but not "I like the printer with a touchscreen" (in this latter example, like is not used an auxiliary verb but as the main verb of the clause). In the exemplary embodiment, the modality of a verb is classed as MODAL (+) or NOT MODAL (−). In the patterns, the mere presence of a modal verb in a text string is not sufficient to identify a suggestion expression. Rather, the modal verb is required to be in a syntactic relation (e.g., SUBJECT or OBJECT relation) on which specific constraints are applied, such as the other element of the syntactic relation is an instance of a specified one (or more) of the semantic classes or is the pronoun I, or where the modal verb is in a perfective aspect.

Verbal aspect refers to whether the action in the verb is ongoing or ended; the PERFECTIVE aspect means the action is finished, from the point of view of the speaker (I liked the new printers), whereas the IMPERFECTIVE aspects indicates the action is ongoing or not yet complete, from the point of view of the speaker (I like the new printer). Tense differs from aspect in that it is not necessarily linked to whether the action is ongoing. For example, "I am liking" and "I have liked" are both present tense but have a different aspect.

The suggestions of improvements extractor 56 applies the set of patterns 24 to the results of the linguistic analysis which have been enriched with terminological information from the structured terminology 28 and thesaurus 26. This terminological information is also used in some of the patterns. For example, a pattern may require that a SUBJECT of a relation is drawn from a specific one of the classes 70, 72, 74, 76, 78, 80, 82 such as the MANUFACTURER class. This means that the pattern will only be fired for a relation where one of the terms (or a stored root form thereof) that are listed in the class MANUFACTURER is in the specified relation.

The patterns can be considered as syntactico-semantic patterns because they incorporate syntactic relations as well as semantic requirements—by limiting one or more of the relations to the classes in the terminology 26 and the suggestion related words in the thesaurus 24. Each pattern can specify one or more syntactic relations. In at least four of the patterns, a subject, object, or predicate in a relation is required to include an instance of a term in a specified one of the semantic classes. As will be appreciated, one or more of the patterns may include a syntactic relation comprising two of the semantic classes, e.g., as subject and object, or subject and modifier, etc. In one embodiment, one or more of the patterns may include a relation in which one of the semantic classes and one of the thesaurus terms are required to be in a syntactic relation.

By way of example, in the context of reviews of a type of product (e.g., printers), the following syntactico-semantic patterns which use linguistic and terminological information can be used to extract suggestion expressions (or entire sentences containing them) which express a suggestion for improvement, using a structured terminology and thesaurus of the types shown in TABLES 1 and 2.

Example 1

$$\begin{bmatrix} \text{SUBJECT[SEMANTIC - CLASS = MANUFACTURER]} \\ \text{PREDICATE} \begin{bmatrix} \text{TENSE = PAST} \\ \text{ASPECT = PERFECTIVE} \\ \text{MODAL = +} \end{bmatrix} \end{bmatrix}$$

This expresses a pattern in which a <manufacturer> term is the subject of a predicate in which a modal verb is used in the past tense and is of the perfective aspect. The indication "+" means simply that the element (here MODAL) is present as opposed to absent.

This pattern, which corresponds semantically to a wish, extracts the relevant sentence:

ABC Co. should have made the bin deep enough as a suggestion (SUBJECT: ABC Co., PREDICATE: should have made the bin deep enough, MODAL VERB in PAST PERFECT TENSE: should have, and the main (non-auxiliary) verb is made. The pattern does not extract the non-relevant sentence:

ABC Co. should be ashamed

This is because ashamed is not a verb in the perfective aspect.

Example 2

$$\begin{bmatrix} \text{SUBJECT[SEMANTIC - CLASS = PRODUCT - FUNCTION]} \\ \text{PREDICATE[SEMANTIC - CLASS = LACK]} \end{bmatrix}$$

This expresses a pattern in which a <product_function> term is the subject of a verb of the semantic class "lack". (Although the class "lack" in the thesaurus also includes nouns, the requirement here is for it to be present in the predicate and therefore be a verb).

This pattern does not correspond to a wish as in the previous example. Rather, it expresses that something is missing in the described product, which implicitly means that the user would have liked to have this component. It extracts, for example, the relevant sentence But the ability to terminate jobs is really lacking, often requiring a hard reset when needed.

Jobs is the part of the subject and is of the semantic type <product_function> and is the subject of the predicate containing the verb is lacking. This particular pattern does not include any constraints regarding verb tense or verb aspect, since it is not found to be necessary.

Example 3

$$\begin{bmatrix} \text{SUBJECT} \begin{bmatrix} PRON = + \\ PL = + \end{bmatrix} \\ \text{PREDICATE} \begin{bmatrix} \text{TENSE = PAST} \\ \text{ASPECT = PERFECTIVE} \\ \text{MODAL = +} \end{bmatrix} \end{bmatrix}$$

This pattern can be rephrased as covering a plural pronoun (in English, the word "they" or "we"), which is subject of a modal verb used in the past tense and the perfective aspect. This pattern does not place any constraint on the class of verb, i.e., it need not come from either of the classes in TABLE 2, nor on the semantic class of the subject, i.e., it does not need to come from any of the classes in TABLE 1.

As an example, this pattern will extract:

They did not make the instructions big enough but not:

We would like a smaller printer

Example 4

$$\begin{bmatrix} \text{MOD[SEMANTIC - CLASS = PRODUCT\_PART]} \\ \text{PREDICATE} \begin{bmatrix} \text{NOUN = +} \\ \text{SEMANTIC - CLASS = ABSENCE} \end{bmatrix} \end{bmatrix}$$

This particular pattern can be rephrased as: the modifier of a noun denoting a product part (in the case of printers, a printer part) is of the class absence. (e.g., missing cable) In this case missing is a pre-modifier of the noun cable, which can be rephrased as [the] cable is missing. In the exemplary embodiment, only nominal modifiers are accepted (modifiers that serve as nouns/part of a noun phrase in the sentence).

Example 5

$$\begin{bmatrix} \text{SUBJECT} \begin{bmatrix} PRON = + \\ SG = + \\ PERS = 1 \end{bmatrix} \\ \text{PREDICATE[LEMMA = WISH]} \\ \text{MOD[SEMANTIC - CLASS = PRODUCT\_PART]} \end{bmatrix}$$

This pattern can be rephrased as a verb with the lemma form "wish" which has as its subject "I" and as a modifier, a product part (e.g., a printer part). This could be extended to other verbs in the "wish" class in the thesaurus.

E.g., I wish for a better cable

Example 6

$$\begin{bmatrix} \text{SUBJECT} \begin{bmatrix} PRON = + \\ SG = + \\ PERS = 1 \end{bmatrix} \\ \text{PREDICATE[LEMMA = MISS]} \\ \text{OBJECT[SEMANTIC - CLASS = PRODUCT\_PART]} \end{bmatrix}$$

This pattern can be paraphrased by the verb having a lemma form miss (such as miss, have missed, will miss) which has as its subject a pronoun in the first person singular (the word "I") and as its object, a term in the class product part (e.g., printer-part). As an example, I missed a paper holder.

But not:

I think a paper holder is missing.

While not all the semantic classes are represented in this selection of patterns, in the exemplary embodiment, each of the semantic classes in the structured terminology and thesaurus is present in at least one of the patterns (otherwise, there is no need to include the class in the terminology or thesaurus).

The suggestions extractor 56 runs each of the patterns in turn on each sentence of the text. If a pattern fires, the sentence may be added to the list 14 (or the entire text from which it was extracted may be added). It may thus not be necessary to test every pattern against a given text string. The output of the system 10 thus includes a list of text strings, such as sentences, expressing either customer wishes regarding the products or stating elements, or functionalities that are missing. The list may simply be an unordered collection of results, or may be ranked based on predetermined ranking criteria.

As will be appreciated, the patterns are not completely foolproof and thus some of the text strings extracted may not actually include a suggestion for improvement. However, in practice, the patterns 24 are desirably selected such that at least about 50% or 60% of the sentences in the list 14 are actual suggestions for improvement rather than being other types of suggestions or not even suggestions at all.

The list 14 can optionally be manually or semi-automatically processed in order to detect what are the main suggestions of the customers without having to send them a questionnaire. For example, the results in the list may be grouped by product aspect or product component, or the like.

The suggestions for improvement can also be associated with any opinions extracted from the text. It is to be appreciated that suggestions of improvements are not necessarily correlated with positive/negative opinions. Suggestions can be expressed in texts where the general opinion is either positive or negative. Even at the sentence level, suggestions can appear in a positive sentence such as:

But the lack of this feature isn't a complaint, it's a request for the next model More often suggestions for improvement appear in neutral or negative comments as in:

Unfortunately many of the manuals are only available on-line as I would have liked a printed main manual.

At the same time, suggestions for improvement can be considered as slightly negative. If someone suggests an improvement for a product, it means that he/she is not completely satisfied with the product. As a consequence, integrating the suggestion review component 54 in a more general opinion-mining tool (such as is described in copending application Ser. No. 13/052,686) can aid in reflecting more precisely the customer's opinion, and complete it, providing useful information to the manufacturer.

Mining suggestions made by customers or product reviewers to improve a given product or some of its related features can be of great interest in business analytics and is a very useful complement to opinion mining. The exemplary system can be integrated into text analysis systems which deal with text analytics and opinion mining to identify, for example, likely customer attrition (a high rate of suggestions can be one feature in predicting that a customer is about to defect to another company's product).

Without intending to limit the scope of the exemplary embodiment, the following examples describe a prototype system for identifying text strings which express suggestions in opinions.

EXAMPLE

A prototype of the exemplary suggestions of improvements system was constructed and used to process a set of printer reviews available from the web: The set included about 3300 customer's reviews about printers from different manufacturers, extracted from a product review website which is not tied to any particular manufacturer.

As the parser, the Xerox Incremental Parser (XIP) was used to perform the morphological and syntactic processing on the reviews, since it outputs the morphological and syntactic information used in the exemplary method.

A simple concept hierarchy 28 of the domain of printers was used. This terminology includes a set of expressions corresponding to concepts such as "printer-manufacturer", "printer-physical-component", "printer-physical-characteristics", "printer-technical-characteristics", as exemplified in TABLE 1, but with a larger number of terms.

The online English Macmillan thesaurus was used to extract a small sub-thesaurus 26 about wishes, regrets, lacks, etc.

As the patterns 24, about 20 patterns were implemented. These were applied on top of the results of the linguistic processing enriched with the terminological information. Patterns were elaborated after a corpus study.

To test the performance of the system, 58 reviews extracted randomly from the initial corpus of comments was manually annotated as being a suggestion for improvement or not. The suggestions for improvement extraction system 10 was run on those documents. The following results were obtained for precision and recall:

Precision: 77% Recall: 70%

These results were significant, given the complexity of the task and the relatively small number of patterns.

The prototype developed for suggestions of improvements in the domain of printers can easily be adapted to handle texts dealing with any other types of manufactured products by simply using a new terminology of the new domain. As the parser can simply be a general-purpose parser and the patterns which are used are also quite general, the main adaptation is the inclusion of new terminological data (which could use the same hierarchy of concepts). There is no need to provide an annotated corpus for extraction of the patterns. Once the suggestions information has been extracted, standard data mining techniques can be applied to cluster, classify, organize and prioritize the suggestions collected from raw input texts.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for extraction of suggestions for improvement comprising:
   providing a structured terminology for a topic, the structured terminology including a set of semantic classes, each of a plurality of the semantic classes including a finite set of terms;
   providing a thesaurus of terms relating to suggestions of improvement;
   receiving a corpus of text documents, each document comprising a text string in a natural language;
   labeling text elements in the text strings which are instances of terms in the structured terminology with the corresponding semantic class;
   labeling text elements in the text strings which are instances of terms in the thesaurus;
   with a processor, applying a set of patterns to the labeled text strings to identify suggestions of improvement expressions, the patterns each defining a syntactic relation between text elements, the patterns including:
      for each of the semantic classes in the set, at least one pattern which specifies a syntactic relation in which one of the text elements in the relation is labeled as an instance of the semantic class, and
      wherein at least one of the patterns specifies a syntactic relation in which one of the text elements in the relation is labeled as an instance of one of the terms in the thesaurus; and outputting a set of suggestions for improvements based on the identified suggestions of improvement expressions.

2. The method of claim 1, further comprising natural language processing the text strings to extract syntactic relations between text elements in the text strings, the syntactic relations including the syntactic relations applied in the patterns.

3. The method of claim 1, wherein the topic comprises a product or service and the structured terminology includes terms related to the product or service.

4. The method of claim 3, wherein the corpus of text documents comprises reviews of the product or service.

5. The method of claim 3, wherein the product comprises an electromechanical device.

6. The method of claim 3, wherein the structured terminology includes a set of classes selected from the group consisting of:
 a. a class of physical parts of the product;
 b. a class of manufacturers of the product;
 c. a class of trade names of the product;
 d. a class of types of the product;
 e. a class of physical attributes of the product;
 f. a class of functional attributes of the product;
 g. a class of commercial attributes of the product; and
   combinations thereof.

7. The method of claim 6, wherein at least three of the classes are selected from the group.

8. The method of claim 1, wherein each of the classes in the structured terminology is in at least one of the patterns as a subject or object in a syntactic relation.

9. The method of claim 1, wherein the thesaurus of terms relating to suggestions of improvement includes a set of terms relating to a belief concept and a set of terms relating to a lack concept.

10. The method of claim 9, wherein the set of terms relating to the belief concept includes terms selected from the group consisting of figure, think, believe, suppose, assume, consider, guess, suspect, speculate, imagine, presume, deny, disclaim, and question.

11. The method of claim 9, wherein the set of terms relating to the lack concept include at least one of:
 a verb selected from the group consisting of: miss and lack; and
 a noun selected from the consisting of: absence; shortage, deficiency; want; dearth; need; insufficiency;
 and combinations thereof.

12. The method of claim 1, wherein the corpus of text documents relate to a type of product and the patterns include a plurality of patterns selected from the group consisting of:
 a) a pattern of the form:

$$\begin{bmatrix} \text{SUBJECT[SEMANTIC – CLASS = MANUFACTURER]} \\ \text{PREDICATE} \begin{bmatrix} \text{TENSE = PAST} \\ \text{ASPECT = PERFECTIVE} \\ \text{MODAL = +} \end{bmatrix} \end{bmatrix}$$

which is satisfied when an instance of a term in one of the semantic classes related to product manufacturer is the subject of a predicate in which a modal verb is used in the past tense and is of the perfective aspect;

b) a pattern of the form:

$$\begin{bmatrix} \text{SUBJECT[SEMANTIC – CLASS = PRODUCT – FUNCTION]} \\ \text{PREDICATE[SEMANTIC – CLASS = LACK]} \end{bmatrix}$$

which is satisfied when an instance of a term in one of the semantic classes related to functions of the product is the subject of a predicate which includes an instance of a verb of the semantic class "lack";

c) a pattern of the form:

$$\begin{bmatrix} \text{SUBJECT} \begin{bmatrix} PRON = + \\ PL = + \end{bmatrix} \\ \text{PREDICATE} \begin{bmatrix} \text{TENSE = PAST} \\ \text{ASPECT = PERFECTIVE} \\ \text{MODAL = +} \end{bmatrix} \end{bmatrix}$$

which is satisfied when a plural pronoun is subject of a modal verb used in the past tense and the perfective aspect;

d) a pattern of the form:

$$\begin{bmatrix} \text{MOD[SEMANTIC – CLASS = PRODUCT\_PART]} \\ \text{PREDICATE} \begin{bmatrix} \text{NOUN = +} \\ \text{SEMANTIC – CLASS = ABSENCE} \end{bmatrix} \end{bmatrix}$$

which is satisfied when a modifier of an instance of a term in one of the semantic classes which is related to physical parts of the product has as its predicate, a noun in the thesaurus which is in the semantic class absence;

e) a pattern of the form:

$$\begin{bmatrix} \text{SUBJECT} \begin{bmatrix} PRON = + \\ SG = + \\ PERS = 1 \end{bmatrix} \\ \text{PREDICATE[LEMMA = WISH]} \\ \text{MOD[SEMANTIC – CLASS = PRODUCT\_PART]} \end{bmatrix}$$

which is satisfied when the verb wish which has as its subject the pronoun I and as a modifier, an instance of a term in the one of the semantic classes which is related to physical parts of the product; and f) a pattern of the form:

$$\begin{bmatrix} \text{SUBJECT} \begin{bmatrix} PRON = + \\ SG = + \\ PERS = 1 \end{bmatrix} \\ \text{PREDICATE[LEMMA = MISS]} \\ \text{OBJECT[SEMANTIC – CLASS = PRODUCT\_PART]} \end{bmatrix}$$

which is satisfied when the verb miss which has as its subject the pronoun I and as its object, an instance of a term in the one of the semantic classes which is related to physical parts product.

13. The method of claim 1, wherein the structured terminology includes at least three classes.

14. The method of claim 1, wherein a plurality of the classes each include at least five terms.

15. The method of claim 1, wherein a majority of the terms in the structured terminology are nouns or noun phrases.

16. The method of claim 1, wherein all the terms in a majority of the classes in the structured terminology are nouns or noun phrases.

17. The method of claim 1, wherein a plurality of the patterns each specify a syntactic relation in which one of the text elements in the relation is labeled as an instance of one of the terms in the thesaurus.

18. The method of claim 1, wherein the method further includes extracting opinions from the text documents.

19. A computer program product comprising a non-transitory recording medium which stores instructions which when executed by a computer, causes the computer to perform the method of claim 1.

20. A suggestions for improvement extraction system comprising memory which stores instructions for performing the method of claim 1 and a processor in communication with the memory for executing the instructions.

21. A system for extraction of suggestions for improvement comprising:
   memory which stores:
      a structured terminology for a topic, the structured terminology including a set of semantic classes, each of a plurality of the semantic classes including a finite set of terms,
      a thesaurus of terms relating to suggestions of improvement, and
      a set of patterns for identify suggestions of improvement expressions, in input text, the patterns each defining a syntactic relation between two text elements, the patterns including, for each of the semantic classes in the set of semantic classes, at least one pattern which specifies a syntactic relation in which one of the text elements in the relation is labeled as an instance of the semantic class, and wherein at least one of the patterns specifies a syntactic relation in which one of the text elements in the relation is labeled as an instance of a term in the thesaurus;
   a parser configured for labeling text elements in input text strings, which are instances of terms in the structured terminology, with the corresponding semantic class and for labeling text elements in the text strings which are instances of terms in the thesaurus;
   a suggestion review component for extracting suggestions for improvement expressions by applying the set of patterns to the input text strings and outputting suggestions for improvement based on the extracted expressions; and
   a processor for implementing the parser and the suggestion review component.

22. A method for forming a system for extraction of suggestions for improvement comprising:
   generating a structured terminology for a topic, the structured terminology including a set of semantic classes, each of a plurality of the semantic classes including a finite set of terms related to the respective semantic class, the terms in the structured terminology including nouns or noun phrases;
   generating a thesaurus of terms relating to suggestions of improvement, the terms in the thesaurus including verbs;
   deriving a set of patterns to be applied to text strings to identify suggestions of improvement expressions, the patterns each defining a syntactic relation between two text elements, the patterns including:
      for each of the semantic classes in the set, at least one pattern which specifies a syntactic relation in which one of the text elements in the syntactic relation is labeled as an instance of the semantic class, and
      wherein at least one of the patterns specifies a syntactic relation in which one of the text elements in the relation is labeled as an instance of a term in the thesaurus; and
   with a processor, testing the patterns on a corpus of text documents to evaluate the performance of the system.

23. The method of claim 22, wherein the method further comprises refining the patterns if the performance is not at a satisfactory level.

* * * * *